United States Patent [19]

Sanderson et al.

[11] 4,369,285
[45] Jan. 18, 1983

[54] POLYAMIDE MOULDING COMPOSITIONS WITH IMPROVED TOUGHNESS

[75] Inventors: John R. Sanderson, Austin, Tex.; Dieter Neuray, Krefeld, Fed. Rep. of Germany; Dietrich Michael, Krefeld, Fed. Rep. of Germany; Heinrich Bonten, Krefeld, Fed. Rep. of Germany

[73] Assignee: Bayer Aktiengesellschaft, Leverkusen, Fed. Rep. of Germany

[21] Appl. No.: 173,270

[22] Filed: Jul. 29, 1980

[30] Foreign Application Priority Data

Aug. 4, 1979 [DE] Fed. Rep. of Germany ....... 2931689

[51] Int. Cl.³ ...................... C08L 77/02; C08G 69/14
[52] U.S. Cl. ..................................... 524/538; 525/424
[58] Field of Search ....................... 525/424, 406, 408; 260/37 N; 524/538

[56] References Cited

U.S. PATENT DOCUMENTS

| | | | |
|---|---|---|---|
| 2,801,990 | 8/1957 | Seeger et al. | 525/424 |
| 3,249,563 | 5/1966 | Balk | 525/424 |
| 3,704,280 | 11/1972 | van der Loos et al. | 525/424 |
| 3,718,713 | 2/1973 | Tanaka et al. | 525/424 |
| 3,758,631 | 9/1973 | Werner et al. | 525/424 |
| 3,892,820 | 7/1975 | Goto et al. | 525/424 |
| 3,923,925 | 12/1975 | Schneider et al. | 525/408 |
| 4,107,131 | 8/1978 | Gergen et al. | 525/424 |
| 4,141,879 | 2/1979 | McCarroll | 525/424 |

FOREIGN PATENT DOCUMENTS

| | | | |
|---|---|---|---|
| 2350852 | 4/1975 | Fed. Rep. of Germany | 525/424 |
| 1099265 | 1/1968 | United Kingdom . | |

*Primary Examiner*—Paul Lieberman
*Assistant Examiner*—Robert E. L. Sellers
*Attorney, Agent, or Firm*—Connolly and Hutz

[57] ABSTRACT

Reinforced thermoplastic moulding compositions comprising polyamides and from 0.1 to 10% by weight polyurethanes from which moulded articles having improved impact strength can be produced.

7 Claims, 3 Drawing Figures

POLYAMIDE MOULDING COMPOSITIONS WITH IMPROVED TOUGHNESS

The invention relates to reinforced thermoplastic moulding compositions which may be filled comprising polyamides and polyurethanes from which moulded articles having improved physical properties can be produced.

Polyamides, in particular polyamide-6 and polyamide-6,6, have become very important commercially as building materials due to their high toughness associated with particular resistance to chemicals and excellent fatigue and wear resistance. However, the strength and rigidity of unreinforced polyamides may not be sufficient for many applications. These disadvantages are substantially overcome by providing the polyamides with fillers or reinforcing materials. Glassfibre-reinforced polyamides have, for example, a high tensile strength and bending strength, rigidity and hardness. Moreover, glassfibre-reinforced polyamides have improved dimensional accuracy and dimensional stability as well as increased stability to hot moulding. However, these advantageous properties are only obtained at the expense of a marked reduction in toughness and extensibility. A disadvantage of glassfibre-reinforced polyamides compared to unreinforced polyamides is their reduced impact resistance under multi-axial stress. Moreover, glassfibre-reinforced polyamides which are dyed with certain pigments generally exhibit a clear reduction of the impact resistance compared to undyed reinfored products.

The adhesives used in practice, such as, for example, trimethoxyaminopropylsilane (Formula I),

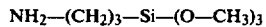  I and sizes which should ensure better adhesion between the glassfibre and polymer matrix as well as good incorporation of the glassfibres improve to a certain extent the impact resistance of the reinforced polyamides.

It is also known, from German Offenlegungsschrift No. 2,744,593, to improve the mechanical properties of a reinforced thermoplastic polymer by adding from 0.01 to 0.05% by weight, based on the total composition, of a polyimide prepolymer. The impact resistance of glassfibre-reinforced polyamides is not, however, improved by this method.

The addition of lower molecular weight plasticisers can improve the toughness of unreinforced polyamides. Such plasticisers cause reduced rigidity in the case of reinforced polyamides. Plasticisers can also impair the adhesion between the filler surface and polymer matrix so that the toughness and tensile strength are markedly reduced.

Another proposed improvement in the toughness of glassfibre-reinforced polyamide moulding compositions according to German Offenlegungschrift No. 2,541,799 involves adding polyureas in quantities of from 0.1 to 5% by weight. The impact strength as determined by DIN 53 443 is removed by this measure. However, if the impact strength is measured by the method indicated below, in which the multi-axial stress of moulded articles is examined, it is found that the impact strength is improved to only a slight extent by the addition of polyureas to glassfibre-reinforced polyamides.

The object of the present invention was therefore to improve the capacity of work-absorption to breakage of reinforced polyamide moulding composition.

This object is surprisingly achieved according to the present invention by adding polyurethanes to the reinforced polyamides in quantities of from 0.1 to 10% by weight, preferably 0.5 to 5% by weight, based on the total composition.

The present invention therefore relates to reinforced and/or filled polyamide moulding compositions, which may be dyed, characterised in that they contain from 0.1 to 10% by weight, preferably from 0.5 to 5% by weight, based on the total composition, of thermoplastic polyurethanes.

The polyurethanes used according to the invention can be produced by known methods, as described, for example, in Houben-Weyl, Volume 14/2, pages 57 to 98, for example (a) from aliphatic or aromatic polyisocyanates, preferably in the presence of suitable organic solvents such as, for example, toluene or chlorobenzene and polyols, (b) from bis-chlorocarbonic acid esters of aliphatic diols, by condensation with aliphatic or aromatic primary or secondary diamines.

The following are used for the production of the polyurethanes:

1. As starting component aliphatic, cycloaliphatic, araliphatic, aromatic and heterocyclic polyisocyanates of the type described, for example, by W. Siefken in Justus Liebigs Annalen der Chemie, 562, pages 75 to 136, for example those corresponding to the formula

in which
n=2 to 4, preferably 2,
and
Q represents an aliphatic hydrocarbon radical containing from 2 to 18, preferably from 6 to 10, carbon atoms,
a cycloaliphatic hydrocarbon radical containing from 4 to 15, preferably from 5 to 10 carbon atoms, an aromatic hydrocarbon radical containing from 6 to 15, preferably from 6 to 13 carbon atoms, or an araliphatic hydrocarbon radical containing from 8 to 15, preferably from 8 to 13 carbon atoms, for example, ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate as well as any mixtures of these isomers; 1-isocyanato-3,3,5-trimethyl-5-isocyanatomethyl-cyclohexane (German Auslegeschrift No. 1,202,785, U.S. Pat. No. 3,401,190); 2,4- and 2,6-hexahydrotoluylene diisocyanate as well as any mixtures of these isomers; hexahydro-1,3- and/or -1,4-phenylene-diisocyanate; perhydro-2,4'- and/or -4,4'-diphenylmethane-diisocyanate; 1,3- and 1,4-phenylene diisocyanate; 2,4- and 2,6-toluylene diisocyanate as well as any mixtures of these isomers; diphenylmethane-2,4'-and/or -4,4'-diisocyanate and naphthylene-1,5-diisocyanate.

Other suitable components include triphenylmethane-4,4',4"-triisocyanate; polyphenyl-polymethylene-poly-isocyanates of the type obtained by aniline-formaldehyde condensation and subsequent phosgenation and described, for example, in British Pat. Nos. 874,430 and 848,671; norbornane diisocyanates according to U.S. Pat. No. 3,492,350; polyisocyanates containing allophanate groups of the type described, for example, in British Pat. No. 994,890; Belgian Pat. No. 761,626 and Netherlands patent application No. 7,102,524; polyisocyanates containing isocyanurate groups of the type described, for example, in U.S. Pat. No. 3,001,973; German Pat. Nos. 1,022,789, 1,222,067 and 1,027,394 and German Offenlegungsschriften Nos. 1,929,034 and 2,004,048; polyisocyanates containing urethane groups of the type described, for example, in Belgian Pat. No. 752,261 or in U.S. Pat. Nos. 3,394,164 and 3,644,457; polyisocyanates containing acylated urea groups according to German Pat. No. 1,230,778; polyisocyanates containing biuret groups of the type described, for example in U.S. Pat. Nos. 3,124,605, 3,201,372 and 3,124,605 as well as in British Pat. No. 889,050; polyisocyanates produced by telomerisation reactions of the type described, for example, in U.S. Pat. No. 3,654,106; polyisocyanates containing ester groups, of the type mentioned, for example, in British Pat. Nos. 965,474 and 1,072,956, U.S. Pat. No. 3,567,763 and German Pat. No. 1,231,688 and polyisocyanates containing polymeric fatty acid esters according to U.S. Pat. No. 3,455,883.

It is also possible to use the distillation residues produced during commercial isocyanate production and containing isocyanate groups, optionally dissolved in one or more of the above-mentioned polyisocyanates. Moreover, it is possible to use any mixtures of the above-mentioned polyisocyanates.

The polyisocyanates which are readily available commercially are generally particularly preferred, for example, 2,4- and 2,6-tpluylene diisocyanate as well as any mixtures of these isomers ("TDI"); polyphenyl-polymethylene-polyisocyanates of the type produced by aniline-formaldehyde condensation and subsequent phosgenation ("crude MDI") and polyisocyanates containing carbo-diimide groups, urethane groups, allophanate groups, isocyanurate groups, urea groups or biuret groups ("modified polyisocyanates"), in particular those modified polyisocyanates derived from 2,4- and/or 2,6-toluylene diisocyanate or from 4,4'- and/or 2,4'-diphenylmethane diisocyanate or hexamethylene diisocyanate.

2. Compounds containing at least two hydrogen atoms which are reactive toward isocyanates, and having a molecular weight of from 32 to 400 are also used as starting components. These include compounds containing hydroxyl groups and optionally amino groups and/or carboxyl groups, preferably compounds containing hydroxyl groups which usually serve as chain extenders or crosslinking agents in polyurethane chemistry. These compounds generally contain from 2 to 4, preferably 2, hydrogen atoms which are reactive toward isocyanates.

Mixtures of various compounds with at least two hydrogen atoms which are reactive toward isocyanates with a molecular weight of from 32 to 400 can also be used.

Examples of these compounds include: ethylene glycol; propane diol-(1,2) and -(1,3); butane diol (1,4) and -(2,3); pentane dion-(1,5); hexane diol-(1,6); octane diol-(1,8); neopentyl glycol; 1,4-bis-hydroxymethyl-cyclohexane; 2-methyl-1,3-propane diol; dibromobutene diol (U.S. Pat. No. 3,723,392); glycerine; trimethylol propane; hexane triol-(1,2,6); trimethylol ethane; pentaerythritol; quinitol; mannitol and sorbitol; castor oil; diethylene glycol; triethylene glycol; tetraethylene glycol; higher polyethylene glycols with a molecular weight of up to 400; dipropylene glycol; higher polypropylene glycols with a molecular weight of up to 400; dibutylene glycol; higher polybutylene glycols with a molecular weight of up to 400; 4,4'-dihydroxy diphenylpropane; di-hydroxymethylhydroquinone; ethanolamine; diethanolamine; N-methyldiethanolamine; triethanolamine and 3-aminopropanol.

Ethane diol-1,2; butane diol-1,4 and hexane diol-1,6 are preferably used.

Polyamines, preferably diamines, can be used in combination with the polyols.

Suitable aliphatic diamines include, for example, ethylene diamine; B 1,4-tetramethylene diamine; 1,11-undecamethylene diamine; 1,12-dodecamethylene diamine and mixtures thereof; 1-amino-3,3,5-trimethyl-5-amino-methylcyclohexane ("isophorone diamine"); 2,4- and 2,6-hexahydrotoluylene diamine and mixtures thereof; 1-amino-3,3,5-trimethyl-5-amino-methylcyclohexane ("isophorone diamine"); 2,4- and 2,6-hexahydrotoluylene diamine and mixtures thereof; perhydro-2,4'- and 4,4'-diaminodiphenyl methane; bis-(3-aminopropyl)-methyl amine; diamine-perhydroanthrazines (German Offenlegungsschrift No. 2,638,731) and cycloaliphatic triamines according to German Offenlegungsschrift No. 2,614,244.

Examples of aromatic diamines include bisanthranilic acid esters according to Offenlegungsschriften Nos. 2,040,644 and 2,160,590; 3,5- and 2,4-diaminobenzoic acid esters according to German Offenlegungsschrift No. 2,025,900; the ester group-containing diamines described in German Offenlegungsschriften Nos. 1,803,635 (U.S. Pat. Nos. 3,681,290 and 3,736,350); 2,040,650 and 2,160,589; ether group-containing diamines according to German Offenlegungsschriten Nos. 1,770,525 and 1,809,172 (U.S. Pat. Nos. 3,654,364 and 3,736,295); 2-halogen-1,3-phenylene diamines which may be substituted in the 5-position (German Offenlegungsschriften Nos. 2,001,772; 2,025,896 and 2,065,869); 3,3'-dichloro-4,4'-diamino-diphenylmethane; toluylene diamine; 4,4'-diaminodiphenylmethane; 4,4'-diaminodiphenyldisulphides (German Offenlegungsschrift No. 2,404,976); diaminodiphenyldithioether (German Offenlegungsschrift No. 2,509,404); aromatic diamines substituted by alkylthio groups (German Offenlegungsschrift No. 2,638,760); diaminobenzene phosphonic acid ester (German Offenlegungsschrift No. 2,459,491); aromatic diamines containing sulphonate or carboxylate groups (German Offenlegungsschrift No. 2,720,166) as well as the high melting diamines listed in German Offenlegungsschrift No. 2,635,400. Examples of aliphatic-aromatic diamines include the aminoalkyl thioanilines according to German Offenlegungsschrift No. 2,734,574.

3. Other suitable lower molecular polyols having a molecular weight of up to 400 include ester diols corresponding to the general formulae

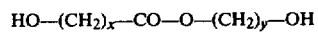

$$HO-(CH_2)_x-CO-O-(CH_2)_y-OH$$

and

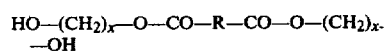

$$HO-(CH_2)_x-O-CO-R-CO-O-(CH_2)_x-OH$$

in which
R represents an alkylene radical containing from 1 to 10, preferably from 2 to 6, carbon atoms or a cycloalkylene or arylene radical containing from 6 to 10 carbon atoms x=2 to 6 and
y=3 to 5
for example, δ-hydroxybutyl-ε-hydroxy-caproic acid ester; ω-hydroxyhexyl-γ-hydroxybutyric acid ester, adipic acid-bis-(β-hydroxyethyl) ester and terephthalic acid-bis (β-hydroxyethyl) ester;

diolurethanes corresponding to the general formula

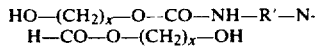

in which
R' represents an alkylene radical containing from 2 to 15, preferably from 2 to 6 carbon atoms or a cycloalkylene or arylene radical containing from 6 to 15 carbon atoms and
x represents a number between 2 and 6
for example, 1,6-hexamethylene-bis-(β-hydroxyethylurethane) or 4,4'-diphenylmethane-bis-(δ-hydroxybutylurethane),
as well as diol ureas corresponding to the general formula

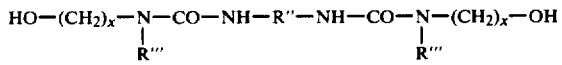

in which
R" represents an alkylene radical containing from 2 to 15, preferably from 2 to 9 carbon atoms, or a cycloalkylene or arylene radical containing from 6 to 15 carbon atoms,
R'" represents hydrogen or a methylene group and
x represents the numbers 2 and 3
for example, 4,4'-diphenyl methane-bis-(β-hydroxy ethyl urea) or the compound

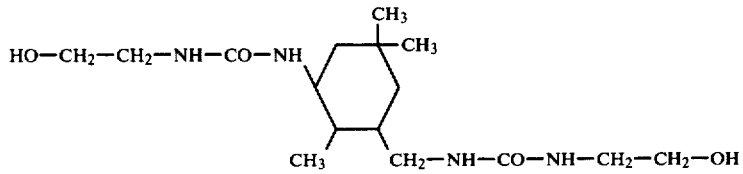

The polyurethanes used according to the invention, in particular the polyurethane ureas have a ratio of urea to urethane groups of at most 1:1, preferably ≦0.5:1.

4. Suitable starting components also include compounds containing at least two hydrogen atoms which are reactive toward isocyanates and generally have a molecular weight of from 400 to 10,000. These include, in addition to compounds containing amino groups or carboxyl groups, preferably compounds containing hydroxyl groups, in particular compounds containing from 2 to 4 hydroxyl groups, specifically those having a molecular weight of from 400 to 10,000, preferably 1000 to 3000, for example polyesters, polyethers, polyacetals, polycarbonates and polyester amides, containing at least 2, generally from 2 to 4, preferably 2 hydroxyl groups, of the type known per se for the production of homogeneous polyurethanes:

(a) Suitable polyesters containing hydroxyl groups include, for example, reaction products of polyhydric, preferably dihydric and optionally also trihydric alcohols containing polybasic, preferably dibasic, carboxylic acids. Instead of the free polycarboxylic acids, the corresponding polycarboxylic acid anhydrides or corresponding polycarboxylic acid esters of lower alcohols or mixtures thereof can be used for producing the polyesters. The polycarboxylic acids can be of an aliphatic, cycloaliphatic, aromatic and/or heterocyclic nature and may be substituted, for example, by halogen atoms and/or unsaturated.

Examples of such carboxylic acids and their derivatives include:

succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylenetetrahydrophthalic acid anhydride; glutaric acid anhydride; maleic acid; maleic acid anhydride; fumaric acid; dimerised and trimerised unsaturated fatty acids, which may be mixed with monomeric unsaturated fatty acids such as oleic acid; terephthalic acid dimethyl ester and terephthalic acid-bis-glycol ester. Suitable polyhydric alcohols include, for example, ethylene glycol; propane diol-(1,2) and -(1,3); butane diol-(1,4) and -(2,3); hexane diol-(1,6); octane diol-(1,8); neopentyl glycol; 1,4-bis-hydroxymethyl cyclohexane; 2-methyl-1,3-propane diol; glycerine; trimethylol propane; hexane triol-(1,2,6); butane triol-(1,2,4); trimethylol ethane; pentaerythritol; quinitol; mannitol and sorbitol; formitol; methyl glycoside; also diethylene glycol; triethylene glycol; tetraethylene glycol and higher polyethylene glycols; dipropylene glycol and higher polypropylene glycols as well as dibutylene glycol and higher polybutylene glycols. The polyesters can contain, in part, terminal carboxyl groups. Polyesters composed of lactones, for example ε-caprolactone or of hydroxycarboxylic acids, for example ω-hydroxycaproic acid, can also be used.

Polyesters of ethylene glycol and/or butane diol or hexane diol and neopentyl glycol and adipic acid are particularly preferred.

(b) The polyethers which can be used according to the invention and contain at least 2, generally from 2 to 4, preferably 2 hydroxyl groups, also include those of a type known per se which are produced, for example, by polymerisation of epoxides such as ethylene oxide; propylene oxide; butylene oxide; tetrahydrofuran; styrene oxide or epichlorohydrin with itself, for example, in the presence of Lewis catalysts such as boron trifluoride, or by an addition reaction of these epoxides, preferably of ethylene oxide and propylene oxide, either in a mixture or in succession with starting components containing reactive hydrogen atoms such as water, alcohols, ammonia or amines, for example, ethylene glycol; propane diol-(1,3) or -(1,2); trimethylol propane; glycerol; sorbitol; 4,4'-dihydroxy diphenyl propane; aniline; ethanol-amine or ethylene diamine. In many cases, those polyethers containing mainly primary hydroxyl groups (up to 90% by weight), based on all the hydroxyl groups present in the polyether are preferred. Polybutadienes containing hydroxyl groups are also suitable according to the invention.

(c) Suitable polyacetals include, for example, the compounds which can be produced from glycols such as diethylene glycol; triethylene glycol; 4,4'-dioxethoxy diphenyl dimethyl methane; hexane diol and formaldehyde. The polyacetals which are suitable according to the invention can also be produced by polymerisation of cyclic acetals such as, for example, trioxane (German Offenlegungsschrift No. 1,694,128).

(d) Suitable polycarbonates containing hydroxyl groups include those of a type known per se which can be produced, for example, by reaction of diols such as propane diol-(1,3); butane diol-(1,4) and/or hexane diol-(1,6); diethylene glycol; triethylene glycol; tetraethylene glycol or thiodiglycol with diaryl carbonates; for example, diphenyl carbonate, or phosgene (German Auslegeschriften Nos. 1,694,080, 1,915,908 and 2,221,751; German Offenlegungsschrift No. 2,605,024).

(e) The polyester amides include, for example, the predominantly linear condensates obtained from polybasic saturated or unsaturated carboxylic acids and their anhydrides and polyhydric saturated or unsaturated amino alcohols.

(f) Polyhydroxyl compounds already containing urethane groups or urea groups as well as natural polyols which may be modified such as castor oil or carbohydrates, for example, starch, can also be used. Products of addition reactions of alkylene oxides with phenol formaldehyde resins or also with urea formaldehyde resins can also be used according to the invention.

Representatives of the above-mentioned compounds to be used according to the invention are described, for example, in High Polymers, Volume XVI, "Polyurethanes, Chemistry and Technology," compiled by Saunders-Frisch, Interscience Publishers, New York, London, Part I, 1962, pages 32 to 42 and pages 44 to 54 and Part II, 1964, pages 5 to 6 and 198 to 199, as well as in "Kunststoff-Handbuch," Part VII, Vieweg-Hochtlen, Carl-Hanser-Verlag, Munich, 1966, for example, on pages 45 to 71. Mixtures of the above-mentioned compounds with at least two hydrogen atoms which are reactive toward isocyanates having a molecular weight of from 400 to 10,000, for example, mixtures of polyethers and polyesters, can obviously be used.

In some cases, it is particularly advantageous to combine low melting and high melting polyhydroxyl compounds with each other (German Offenlegungsschrift No. 2,706,297).

It is particularly preferred to use polyurethanes based on (a) polypropylene diol; polyethane diol butane diol adipate; polybutane diol adipate; butane diol and diphenyl methane-4,4'-diisocyanate, (b) polybutane diol adipate, butane diol and diphenyl methane, 4,4'-diisocyanate, (c) or polyhexane diol neopentyl glycol adipate, hydroquinone dihydroxyallyl ether and diphenylmethane-4,4'-diisocyanate.

Preferred polyurethanes in the context of the invention also include those based on hexamethylene diisocyanate and ethane diol-1,2, butane diol-1,4 and hexane diol-1,6.

The polyurethanes in context to the invention are preferably produced under maintaining an NCO/OH-ratio of from 0,95:1 to 1,2:1, preferably of from 0,98:1 to 1,1:1.

Suitable polyamides include those which are obtained by polymerisation of cyclic lactams, preferably containing at least 7 ring members of ε-caprolactam, or by polycondensation of α,ω-aminocarboxylic acids such as ε-aminocaproic acid or ω-aminoundecanic acid. Polyamides obtained by polycondensation of diamines and dicarboxylic acids, for example, polyamides of hexamethylene diamine and adipic or sebacic acid are also suitable. Copolyamides of for example caprolactam or ε-amino caproic acid, acipic acid and hexamethylene diamine as well as mixtures of for example such of polyamide-6 and polyamide-6,6 are also suitable. Polyamide-6 and/or polyamide -6,6 are particularly preferred.

The relative viscosity of the polyamides used, measured as a 1% solution in m-cresol at 25° C., ranges from 2.5 to 5.0, preferably from 2.8 to 4.5.

The polyamide moulding compositions according to the invention are preferably reinforced with glass fibres which may be provided with the conventional commercial adhesives and sizes, in quantities of from 10 to 60% by weight, preferably 15-15% by weight. The fibres preferably have a diameter of between 8 and 14 μm and have in general an average fibre length in the granulate of between 0.1 and 0.5 mm.

The moulding composition according to the invention can contain, instead of the fibres, in particular glass fibres, or in combination with the fibres, also other fillter or further reinforcing materials, for example, glass beads, asbestos, talcum, kaolin, wollastonite, microvite, mica or chalk. The quantities of the fillers or other reinforcing materials used in combination with the fibres preferably amount to from 10 to 50% by weight, based on the quantity of fibres.

The polyurethanes according to the invention are preferably incorporated together with the glass fibres and/or other fillers and reinforcing materials on, for example, conventional single shaft and/or multiple shaft screw machines by known methods. However, the polyurethane can be rolled with separately produced reinforced polyamide granulate and the additives according to the invention be incorporated into the reinforced polyamide as it is being shaped into a finished article.

The moulding compositions according to the invention can also contain the conventional dyes, pigments, stabilisers, nucleation agents, mould removal agents and flame-proofing agents.

The moulding compositions according to the invention are distinguished by a clearly improved work capacity without impairing the conventional characteristic polyamide properties. They are particularly suitable for the production of moulded articles which have to withstand high impact stress thus, for example, for drilling machine housings, bumper housings.

EXAMPLES 1 TO 10

Mixtures of polycaprolactam having a viscosity, measured as a 1% solution in m-cresol at 25° C. of 3.1, and polyurethanes having the composition indicated in Table 1 and the conventional quantities of nucleation agents and mould-releasing agents, were melted on a double shaft extruder at from 250° to 270° C. Glass fibres were incorporated into the melt of polycaprolactam and polyurethane in the form of chopped strands in such a way that the mixture extruded through a die in strand form contained about 30% by weight of glass fibres. The strands were cooled in a water bath, granulated and dried. The granulate was processed into test samples on an injection moulding machine. The injected articles were tested dry in a freshly injected state.

The measure of the damage work by the multiaxial impact test was carried out in accordance with DIN 53 443 in order to examine the mechanical properties.

The impact strength is known from experience to depend considerably on the degree of orientation of the fibres in the case of fibre-reinforced materials. With the test samples produced by the injection moulding method for the impact bending test according to DIN 53 453, the glass fibres are orientated to a great extent in the direction of flow, i.e. parallel to the length of the test sample. The impact stress takes place transversely to the direction of flow (transversely to the fibre direction). This is why higher impact strength values ($a_n$) are measured as the glass fibre content increases. However, the impact strength is much lower along the flow direction (fibre direction).

IN THE DRAWING

Figure 3:
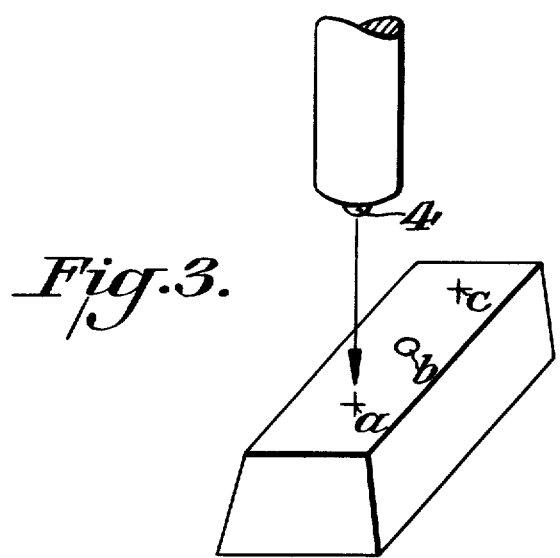
FIG. 3 is a pictoral view of the apparatus for carrying out the falling-bolt test.

The impact or falling bolt test according to DIN 53 443 as illustrated in FIG. 3, is known from experience to give a better picture of the toughness of the reinforced polyamides under impact stress. The ball 4 has a radius of 25 mm in this figure.

(a) represents the point of impact of the ball, (b) represents the sprue (diameter about 4 mm) in the centre of the bottom face and (c) represents a test point parallel to (a).

Figure 1:
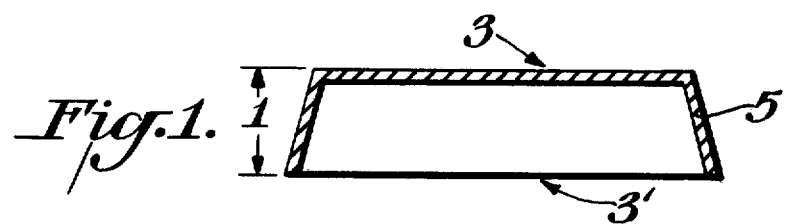
FIG. 1 is a longitudinal cross-sectional view in elevation of the test box shown in FIG. 3.
Figure 2:
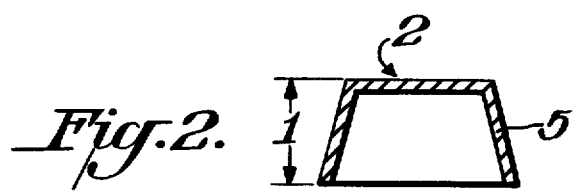
FIG. 2 is a lateral cross-sectional view in elevation of the test box shown in FIG. 3

However, as a condition of this test, the test samples must have a minimal degree of orientation such as, for example, the small test box illustrated in FIGS. 1 and 2 which has a height 1 of 40 mm, a width 2 of 46.7 mm and a length 3 of 106.7 mm or 3' of 120 mm and a wall thickness 5 of 1.5 mm.

TABLE 1

| Example No. | 1 | 2 | 3 | 4 | 5 | Comparison Example | 6 | 7 | 8 | 9 | 10 | Comparison Example |
|---|---|---|---|---|---|---|---|---|---|---|---|---|
| Additive, type | — | — | a | a | a | f | b | b | b | c | d | f |
| (% by weight) | — | — | 5 | 3 | 5 | 0.50 | 5 | 3 | 5 | 5 | 0.50 | 0.50 |
| Dyes e | — | 0.5 | — | 0.5 | 0.5 | — | — | 0.5 | 0.5 | — | — | — |
| Physical properties |  |  |  |  |  |  |  |  |  |  |  |  |
| Impact strength $a_n$ (kJ/m²) g | 59 | 50 | 62 | 56 | 54 |  | 60 | 55 | 57 | 54 | 60 |  |
| Notched impact strength (kJ/m²) g | 12.5 | 11.1 | 17.8 | 16.2 | 12.6 |  | 19.3 | 16.0 | 16.3 | 14.9 | 11.9 |  |
| Impact work W (N . m) h | 1.2 | 1.0 | 3.3 | 3.1 | 3.1 | 1.7 |  |  |  |  |  |  |
| Damage work to the box (N . m) h |  |  |  |  |  |  | 2.8 | 3.0 | 3.2 | 3.3 | 2.1 | 1.7 | a = polyurethane from propane diol-(1,2), polyethane diol-butane diol-(1,4)-adipate, polybutane diol-(1,4)-adipate, butane diol-(1,4) and diphenyl methane-4,4'-diisocyanate.
b = polyurethane from polybutane diol-(1,4)-adipate, butane diol-(1,4) and diphenylmethane-4,4'-diisocyanate.
c = polyurethane from polyhexane diol-(1,2)-neopentyl glycol-adipate, hydroquinone dihydroxyallylether and diphenyl methane-4,4'-diisocyanate.
d = polyurethane from hexamethylene diisocyanate and butane diol-1,4.
e = ultramarine and cadmium pigments.
f = polyurea from hexamethylene diamine and hexamethylene diisocyanate.
g = DIN 53 453.
h = tested on the basis of DIN 53 443 as described in the foregoing text.

We claim:

1. A reinforced and/or filled polyamide moulding composition which contains from 0.5 to 5% by weight, based on the total composition, of a thermoplastic polyurethane which has been produced while maintaining an NCO/OH ratio of from 0.98:1 to 1.1:1.

2. A moulding composition as claimed in claim 1 which is dyed.

3. A moulding composition as claimed in claim 1 in which the polyurethane has a urea to urethane group ratio of at most 1:1.

4. A moulding composition as claimed in claim 1 which contains from 10 to 60% by weight of inorganic fillers and/or reinforcing materials.

5. A moulding composition as claimed in claim 4 which contains from 10 to 60% by weight of glass fibres.

6. A moulding composition as claimed in claim 1 which contains from 0.5 to 5% by weight of polyurethanes.

7. A moulding composition as claimed in claim 1 which contains as polyamide polyamide-6 or polyamide-6,6.

* * * * *